UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE RHINE, GERMANY, A CORPORATION.

ANTHRACENE DYE AND PROCESS OF MAKING SAME.

No. 876,190.　　　Specification of Letters Patent.　　　Patented Jan. 7, 1908.

Application filed August 23, 1907. Serial No. 389,881.

*To all whom it may concern:*

Be it known that I, MAX HENRY ISLER, chemist, citizen of the Swiss Republic, residing at Mannheim, Germany, have invented new and useful Improvements in Anthracene Dyes and Process of Making the Same, of which the following is a specification.

I have discovered that amidoanthraquinones, for instance 1-amidoanthraquinone, 2-amidoanthraquinone, and the diamidoanthraquinone obtainable by reducing the alpha-dinitroanthraquinone described in the specification of the German Patent No. 72,685, can by treatment with a metal (for instance copper, or aluminum) in sulfuric acid solution be converted into vat coloring matters possessing satisfactory fastness. My new coloring matters are characterized by the following properties. They are insoluble in water and in caustic soda solution, and are soluble in concentrated sulfuric acid yielding from olive-brown to reddish brown solutions the color of which does not alter on the addition of boric acid. They are also soluble in 78% nitric acid giving from yellow-brown to red-brown solutions. In alkaline hydrosulfite solution they yield from brown-violet to violet vats which color cotton similar shades and these shades upon washing are converted into from olive-green to brown shades of excellent fastness.

The coloring matter which I desire to claim specifically is that obtainable from 2-amidoanthraquinone and in particular it yields reddish brown solutions both in concentrated sulfuric acid and in 78% nitric acid, and with alkaline hydrosulfite solution it gives a violet vat which colors cotton violet and this shade upon washing is converted into a fast brown.

The following examples will serve to illustrate further the nature of my invention and how it can be carried into practical effect, but my invention is not confined to these examples. The parts are by weight.

Example 1: Dissolve fifty (50) parts of 1-amidoanthraquinone in five hundred (500) parts of ninety (90) per cent. sulfuric acid, add twenty-five (25) parts of copper powder, and heat the mixture, while stirring, for nine (9) hours at a temperature of ninety (90) degrees centigrade. Then introduce the melt into water, filter off the coloring matter which separates out, and wash it with water till it is neutral. With alkaline hydrosulfite it yields a brown-violet vat which dyes cotton brown-violet which on washing is converted into olive-green.

Example 2: Dissolve fifty (50) parts of 2-amidoanthraquinone in five hundred (500) parts of ninety (90) per cent. sulfuric acid add fifty (50) parts of copper powder and heat the mixture, while stirring, for nine (9) hours at a temperature of ninety (90) degrees centigrade. Work up the melt as described in the foregoing first example. With alkaline hydrosulfite the coloring matter yields a violet vat which dyes cotton violet, which on washing is converted into brown.

Example 3: Dissolve fifty (50) parts of the diamidoanthraquinone obtainable by reducing the alpha-dinitroanthraquinone produced as described in the specification of the German Patent No. 72,685, in five hundred (500) parts of ninety-seven (97) per cent. sulfuric acid, add fifty (50) parts of copper powder, and heat the whole, while stirring, for nine (9) hours at a temperature of ninety (90) degrees centigrade. Work up the melt in the manner described in the foregoing first example. The coloring matter is similar to that produced according to the foregoing second example.

Now what I claim is:

1. The process of producing coloring matter of the anthracene series by treating an amidoanthraquinone with a metal in sulfuric acid solution.

2. The process of producing coloring matter of the anthracene series by treating 2-amidoanthraquinone with copper powder in sulfuric acid solution.

3. As new articles of manufacture the coloring matters of the anthracene series which can be obtained by treating an amidoanthraquinone with a metal in sulfuric acid solution, which coloring matters are insoluble in water and in caustic soda solution, are soluble in concentrated sulfuric acid yielding from olive-brown to reddish brown solutions the color of which does not alter on the addition of boric acid, are also soluble in 78% nitric acid giving from yellow-brown to red-brown solutions, and are soluble in alkaline hydrosulfite solution yielding from brown-violet to violet vats which dye cotton substantively yielding from olive-green to brown shades.

4. As a new article of manufacture the coloring matter of the anthracene series which can be obtained by treating 2-amidoanthraquinone with copper powder in sulfuric acid solution, which coloring matter is insoluble in water and in caustic soda solution, is soluble both in concentrated sulfuric acid and in 78% nitric acid yielding reddish brown solutions, and is soluble in alkaline hydrosulfite solution yielding a violet vat which dyes cotton substantively brown shades.

In testimony whereof I have hereunto set my hand in the presence of two subscribing witnesses.

MAX HENRY ISLER.

Witnesses:
J. ALEC. LLOYD,
ERNEST E. EHRHARDT.